US010055242B2

(12) United States Patent
Perreault et al.

(10) Patent No.: US 10,055,242 B2
(45) Date of Patent: Aug. 21, 2018

(54) VIRTUALIZING AUDIO DECODING HARDWARE

(71) Applicant: Microsoft Technology Licensing, LLC, Redmond, WA (US)

(72) Inventors: Spencer Dean Perreault, Bellevue, WA (US); Barry Clayton Bond, Redmond, WA (US); Jonathan David Morrison, North Bend, WA (US); Robert Binneweg Francis, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/885,725

(22) Filed: Oct. 16, 2015

(65) Prior Publication Data

US 2017/0110138 A1   Apr. 20, 2017

(51) Int. Cl.
*G06F 11/00* (2006.01)
*G06F 9/455* (2018.01)
*G06F 3/16* (2006.01)
*G10L 19/16* (2013.01)

(52) U.S. Cl.
CPC .......... *G06F 9/45558* (2013.01); *G06F 3/162* (2013.01); *G06F 2009/45579* (2013.01); *G06F 2009/45583* (2013.01); *G06F 2212/152* (2013.01); *G10L 19/16* (2013.01)

(58) Field of Classification Search
CPC ...................... G06F 2212/152; G06F 2212/403
See application file for complete search history.

(56) References Cited

U.S. PATENT DOCUMENTS

| 5,574,873 | A | 11/1996 | Davidian |
| 5,742,802 | A | 4/1998 | Harter et al. |
| 6,782,193 | B1 * | 8/2004 | Nakatani ................ G11B 20/10 |
| | | | 386/216 |
| 7,369,532 | B2 * | 5/2008 | Silvester ............. H04W 76/025 |
| | | | 370/349 |
| 7,688,822 | B2 * | 3/2010 | Iwase .................... G10L 19/167 |
| | | | 370/389 |
| 8,054,980 | B2 * | 11/2011 | Wu ......................... H04S 5/005 |
| | | | 381/1 |

(Continued)

OTHER PUBLICATIONS

Ford, Bryan, "VXA: A Virtual Architecture for Durable Compressed Archives", In Proceedings of 4th USENIX Conference on File and Storage Technologies, Dec. 13, 2005, pp. 295-308.

(Continued)

*Primary Examiner* — Esaw T Abraham
(74) *Attorney, Agent, or Firm* — Klarquist Sparkman, LLP

(57) ABSTRACT

Systems and methods for virtualizing audio decoding hardware of a guest audio decoder are disclosed. A method may include storing received encoded audio in main memory of a host computing device. An operation to access a register or memory of the audio decoding hardware of the guest audio decoder may be intercepted. The register or memory has an associated address in the main memory of the host computing device. The intercepted operation can include a register WRITE operation, and can be translated into an operation associated with accessing dedicated decoder memory of a host audio decoder of the host computing device.

20 Claims, 8 Drawing Sheets

(56) References Cited

U.S. PATENT DOCUMENTS

| | | | | |
|---|---|---|---|---|
| 8,249,433 | B2* | 8/2012 | Tanaka | H04N 21/23406 |
| | | | | 381/124 |
| 8,397,050 | B2 | 3/2013 | Chang et al. | |
| 8,489,136 | B2* | 7/2013 | Banks | H04L 1/0015 |
| | | | | 455/127.1 |
| 8,533,428 | B2 | 9/2013 | Bennett et al. | |
| 8,539,025 | B2* | 9/2013 | Husain | G06F 3/14 |
| | | | | 709/203 |
| 8,724,696 | B2* | 5/2014 | Byford | H04N 19/00 |
| | | | | 375/240.01 |
| 8,972,984 | B2* | 3/2015 | Meisner | G06F 3/165 |
| | | | | 704/503 |
| 8,997,099 | B2 | 3/2015 | Bennett et al. | |
| 9,058,292 | B2 | 6/2015 | Panesar et al. | |
| 9,069,616 | B2* | 6/2015 | Kadatch | G06F 9/5027 |
| 9,244,699 | B2* | 1/2016 | Scragg, Jr. | G06F 3/165 |
| 9,363,602 | B2* | 6/2016 | Mentz | H04R 5/033 |
| 2008/0028400 | A1 | 1/2008 | Taillefer et al. | |
| 2008/0250222 | A1 | 10/2008 | Gokhale et al. | |
| 2009/0113423 | A1 | 4/2009 | Hiltgen et al. | |
| 2010/0174889 | A1 | 7/2010 | Maliszewski et al. | |
| 2013/0239106 | A1 | 9/2013 | Srinivasan et al. | |
| 2014/0173600 | A1 | 6/2014 | Ramakrishnan Nair | |
| 2015/0089502 | A1 | 3/2015 | Horovitz et al. | |

OTHER PUBLICATIONS

Harney, Smile, "XMA Converter—Convert XMA to WAV, MP3, WMA, AAC, AIFF, RA", Published on: Mar. 13, 2014, Available at: http://www.idealshare.net/video-converter/xmv-xma-converter.html.

"Use Integration Components to Enhance Working with VMs", Published on: Jul. 11, 2012, Available at: https://technet.microsoft.com/en-us/magazine/gg445028.aspx.

* cited by examiner

VIRTUALIZING AUDIO DECODING HARDWARE

BACKGROUND

Virtualization techniques are used to enable an application configured to execute in a first device environment to instead execute in a second device environment. The first device environment, conventionally called the guest environment, is emulated in the second device environment, conventionally called the host environment, which allows for expansion of the number of applications that can be run on the host environment. Such virtualization techniques are, therefore, becoming increasingly popular, especially in the context of devices such as game consoles, set-top boxes, cell phones, portable entertainment devices, and other consumer electronic devices primarily designed to perform a limited set of functions. During virtualization, an emulated guest device environment is created on a host computing device, so that software targeting the guest environment can be run on the host computing device, utilizing hardware of the host computing device. However, virtualization may be difficult when certain aspects of the host computing device cannot be directly exposed and used by the software that is targeting the guest environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects of the innovations described herein, a host computing device may include a processing unit, main memory, and a host audio decoder with dedicated memory. The host computing device is configured to perform operations for virtualizing audio decoding hardware of a guest audio decoder. The operations include storing received encoded audio in the main memory. An operation to access a register or memory of audio decoding hardware of a guest audio decoder can be intercepted. The register or memory has an associated address in the main memory of the host computing device. The intercepted operation may include at least one memory/register WRITE operation, and can be translated into one or more operations associated with accessing the dedicated memory of the host audio decoder.

In accordance with one or more other aspects of the innovations described herein, a method for virtualizing audio decoding hardware of a guest audio decoder may include receiving encoded audio and identifying a context that includes one or more buffers (e.g., one or more input buffers and an output buffer). An operation to access a register of the audio decoding hardware of the guest audio decoder can be detected. The register may be associated with an emulated guest register at a location within the main memory of a host computing device. In response to the operation, ownership of the context is assigned to one of the guest audio decoder (which has access to the main memory of the host computing device) and a host audio decoder (which has access to dedicated memory of the host audio decoder of the host computing device). The data in the context can be manipulated based on the assigned ownership. For example, encoded data in one or more input buffers (that are configured to store received encoded audio) can be transferred (or copied) from the main memory to the dedicated memory of the host audio decoder. After the encoded audio is decoded, the data in the context may be updated by storing the decoded audio in an output buffer. After the output buffer is updated with the decoded audio, the corresponding input buffer can be invalidated so that another input buffer is used the next time encoded audio is to be decoded.

In accordance with one or more other aspects of the innovations described herein, a computer-readable storage medium may store computer-executable instructions for virtualizing audio decoding hardware of a guest audio decoder. The operations can include storing received encoded audio in main memory of the host computing device. A first WRITE operation to a register that is emulated in the main memory can be detected. The register can be an emulated guest register located within a defined address range of the main memory of the host computing device. Upon detecting the first WRITE operation, at least a portion of the encoded audio is replicated (or transferred) into dedicated memory for decoding by a host audio decoder of the host computing device, to generate decoded audio. A second WRITE operation to the register can be detected. The operations can also include verifying that decoding of the at least a portion of the encoded audio is complete. In response to the second WRITE operation, the decoded audio is provided from the dedicated memory (e.g., the decoded audio can be transferred/copied from the dedicated memory to the main memory).

As described herein, a variety of other features and advantages can be incorporated into the technologies as desired.

DETAILED DESCRIPTION

In accordance with techniques described herein, audio decoding hardware of a guest device can be virtualized in a host device. More specifically, both the guest and host devices may have dedicated hardware for decoding compressed audio, and the host device can be used to virtualize (emulate) the dedicated decoding hardware of a guest audio decoder configured to execute in the guest device. In this regard, an emulated environment can be created in which software targeting the guest device and utilizing the guest device's dedicated decoder hardware may also be run on the host device with differing hardware. For example, the host device may include an audio decoder (host audio decoder) using a dedicated memory used during the decoding.

In accordance with an example embodiment of the disclosure, the host audio decoder's memory may not be directly exposed to the guest device software due to, e.g., a mismatch in data structure representation, or because the host audio decoder's memory is dedicated memory that is not directly addressable by the guest software and the emulated guest decoder. In this instance, guest device software may be executed on the host device, and interactions between the guest audio decoder and the rest of the host device may be intercepted (e.g., memory accesses and register writes resulting from running the guest device software on the host device). The intercepted interactions can be translated to one or more operations on the host decoder and its dedicated memory.

Figure 1:
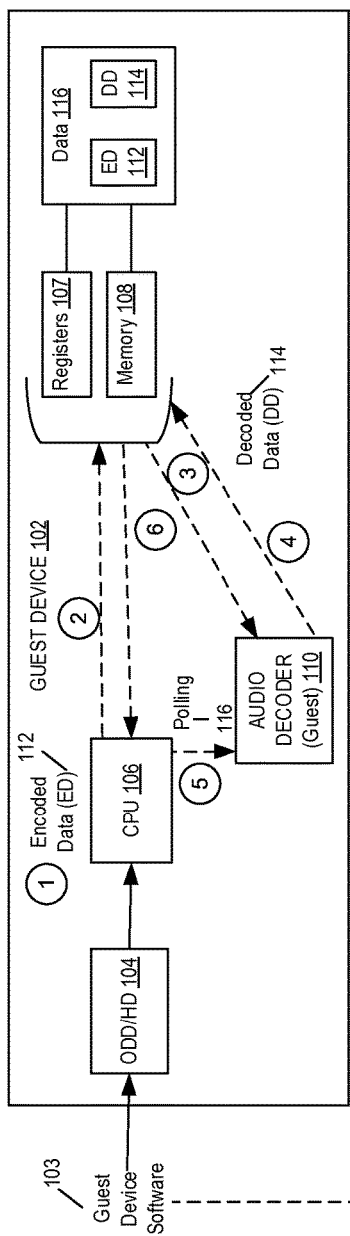
FIG. 1 is a schematic diagram illustrating an exemplary guest device with audio decoding functionalities.

FIG. 1 is a schematic diagram illustrating an exemplary guest device with audio decoding functionalities. Referring to FIG. 1, there is illustrated a guest device 102. The guest device 102 (as well as the host device 202 in FIG. 2) can be a game console, and the guest device software 103 can be game software configured to run on the guest device 102. Even though a game console is described as an embodiment for the guest device 102 and the host device 202, other types of platforms can serve as guest/host systems, such as a set-top box, a portable phone, a portable entertainment device (e.g., a tablet), a personal digital assistant, or another type of a computing device.

The guest device 102 can include an optical disk drive (ODD) or hard drive (HD) 104, a CPU 106, memory 108 and an audio decoder 110 (guest audio decoder). The guest device 102 may also use one or more registers 107 when processing data 116, associated with the guest device software 103. The data 116 may include encoded data 112 (e.g., encoded audio) and/or decoded data 114 (e.g., decoded audio).

In operation, guest device software (e.g., on a video game disk) is read by the ODD 104 or read from the HD 104, and encoded data (e.g., encoded audio) 112 can be read by the CPU 106 (stage 1 in FIG. 1) and stored in memory 108 and/or one or more dedicated registers 107 (stage 2 in FIG. 1). The CPU 106 may inform the audio decoder 110 where in memory 108 and/or registers 107 the encoded data 112 is stored and where the decoded data 114 should be stored. The audio decoder 110 may then retrieve the encoded data 112 (stage 3 in FIG. 1), decode it to generate decoded data 114, and then store the decoded data 114 back in the designated location in memory and/or registers 107 (stage 4 in FIG. 1). The CPU 106 may use a polling signal 116 to poll the audio decoder 110 (stage 5 in FIG. 1) regarding whether decoding has completed. More specifically, during such polling operation, the CPU 106 may read registers and memory (e.g., context data stored in memory and updated by the decoder) to determine whether decoding has been completed. If decoding has completed, the CPU 106 retrieves the decoded data 114 from memory for further processing (stage 6 in FIG. 1).

FIG. 1 shows registers 107 and memory 108 accessible by the CPU 106 and guest audio decoder 110 of the guest device 102. Alternatively, the registers 107 and memory 108 are dedicated registers and dedicated memory for the guest audio decoder 110 (that is, accessible to the guest audio decoder 110) but not other components of the guest device 102. According to techniques described herein, the virtualized audio decoding hardware of the guest audio decoder 110 can be hardware dedicated to the guest audio decoder 110 on the guest device 102 or hardware generally available on the guest device 102.

Figure 2:
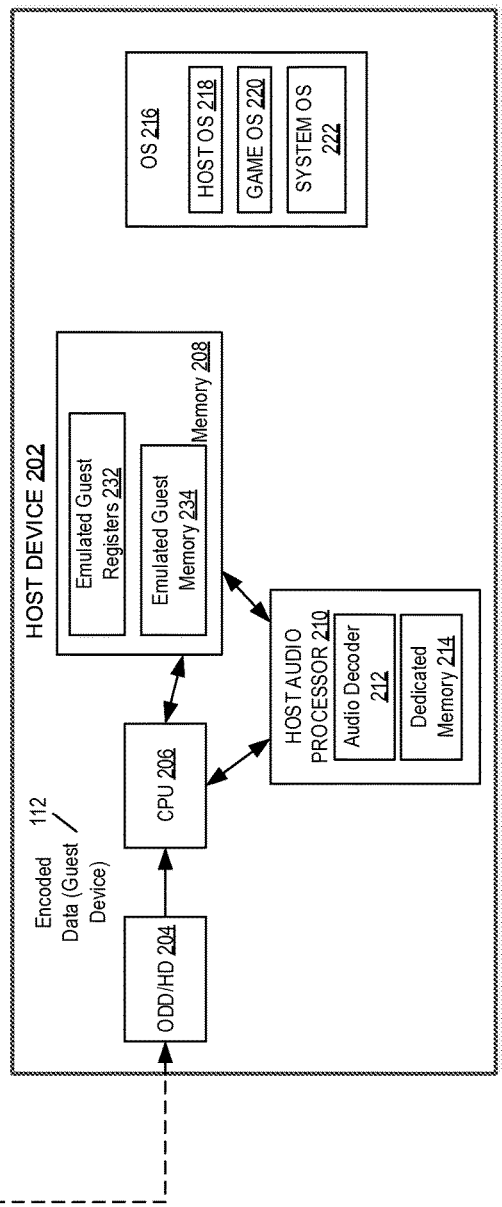
FIG. 2 is a schematic diagram illustrating an exemplary host device (including a host audio decoder) configured to emulate a guest device (for a guest audio decoder), in accordance with an example embodiment of the disclosure.

FIG. 2 is a schematic diagram illustrating an exemplary host device configured to emulate a guest device (including a guest audio decoder), in accordance with an example embodiment of the disclosure. Referring to FIG. 2, the host device 202 may comprise suitable circuitry, interfaces, logic and/or code operable to virtualize the guest audio decoder 110, so that the guest device software 103 can be executed on the host device 202. The host device 202 may comprise an ODD/HD 204, a CPU 206, memory 208, and a host audio processor 210.

In an example embodiment, both the guest device 102 and the host device 202 may be game console devices. For example, the guest device 102 may be a MICROSOFT® XBOX 360 game console, and the host device 202 may be a MICROSOFT® XBOX ONE game console, with the guest device software 103 being a MICROSOFT® XBOX 360 game. Alternatively, the guest device 102 and/or host device 202 is another type of game console device (e.g., a version of Sony Playstation, a version of Nintendo Wii, or a version of Steam Machine), or another type of computing device. In this regard, the encoded data 112 may be in an XMA (MICROSOFT® XBOX Media Audio) format or other encoded audio format, and the decoded data 114 may be in another format, such as pulse code modulation (PCM) audio data and/or another type of audio data.

The CPU 206 may be executing one or more operating systems 216, which may include a host operating system (OS) 218, a game OS 220, and/or a system OS 222. The system OS 222 may be used for running the user interface application of the host device 202, when the host device 202 functions as a gaming console. The game OS 220 may be used for performing one or more functions associated with running games on the host device 202, including emulating one or more guest device 102 functions on the host device 202 when guest device software 103 is being executed on the host device 202. The host OS 218 may be used for performing one or more data processing functions associated with the host device 202.

The host audio processor 210 may comprise suitable circuitry, interfaces, logic and/or code operable to perform audio decoding functions using an audio decoder 212 (host audio decoder) and dedicated memory 214 accessible to the audio decoder 212. In particular, the audio decoder 212 may be configured to decode audio data, using the dedicated memory 214 to store encoded and decoded audio data, without using the main host memory 208 to store such data. To emulate hardware of the guest device, the memory 208 may be used to store emulated guest registers 232 (corresponding to guest device registers 107) and emulated guest memory 234 (corresponding to guest device memory 108). More specifically, the emulated guest registers 232 and emulated guest memory 234 may be located at known locations (e.g., known memory addresses) used by the guest audio decoder 110 when decoding the encoding data 112, or they may correspond to dedicated registers and memory of the guest audio decoder 110 on the guest device 102. A more detailed diagram of the memory 208 and the host audio processor 210 is illustrated in FIG. 3.

In accordance with an example embodiment of the disclosure, the host audio decoder 212 may be implemented in hardware or it may be implemented entirely in software (i.e., the host audio decoder 212 may be virtualized rather than being implemented in hardware).

Figure 3:
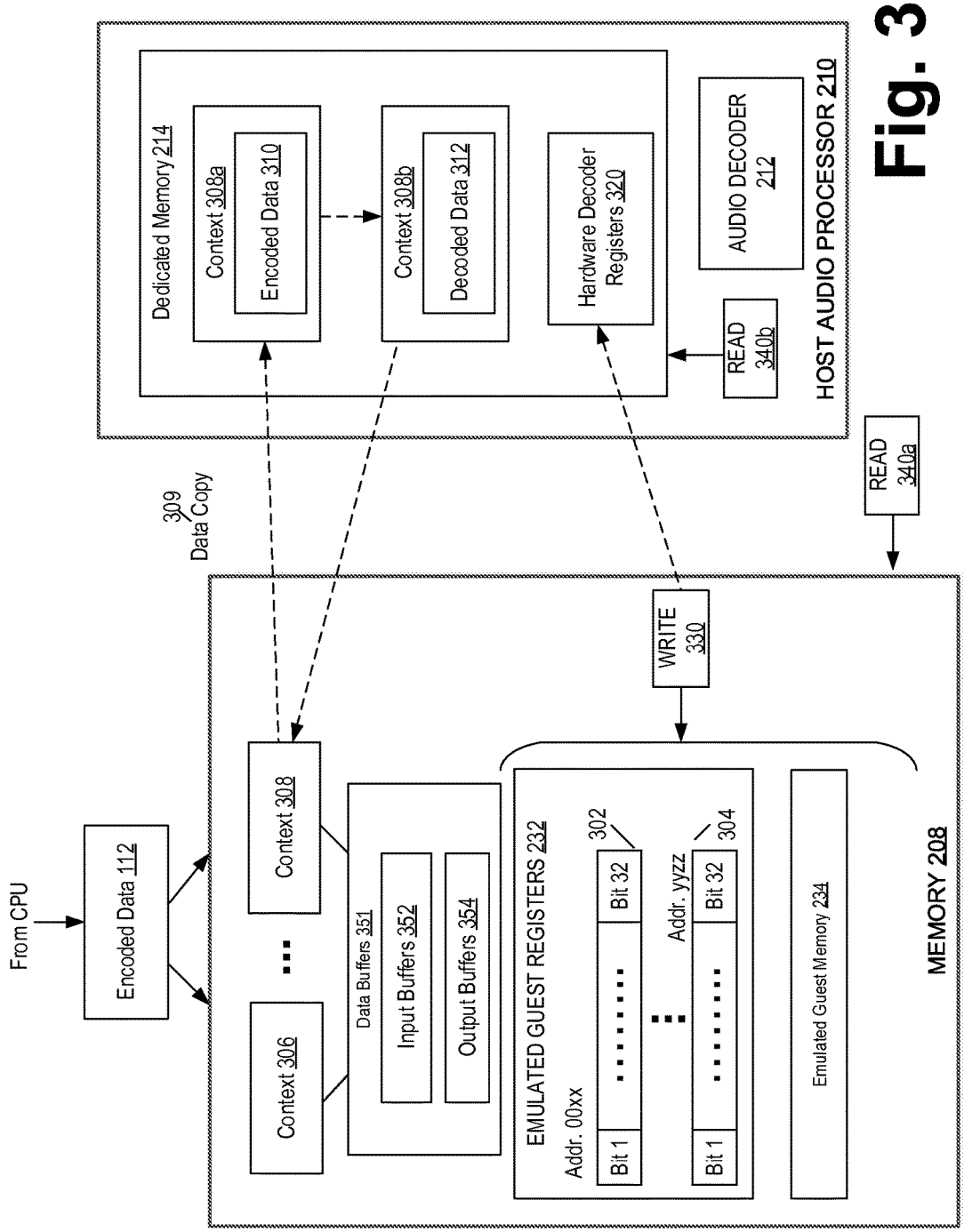
FIG. 3 is a schematic diagram illustrating transfer of data between main memory and dedicated memory of an audio decoder of the host device, during virtualizing audio decoding hardware of the guest device, in accordance with an example embodiment of the disclosure.

FIG. 3 is a schematic diagram illustrating transfer of data between main memory and dedicated decoder memory of the host device, during virtualizing audio decoding hardware of the guest device (for the guest audio decoder), in accordance with an example embodiment of the disclosure. Referring to FIG. 3, after guest device software 103 is run on the host device 202, encoded data 112 is read by the CPU 206, and data for contexts 306, . . . , 308 is identified based on the encoded data 112.

Figure 4:
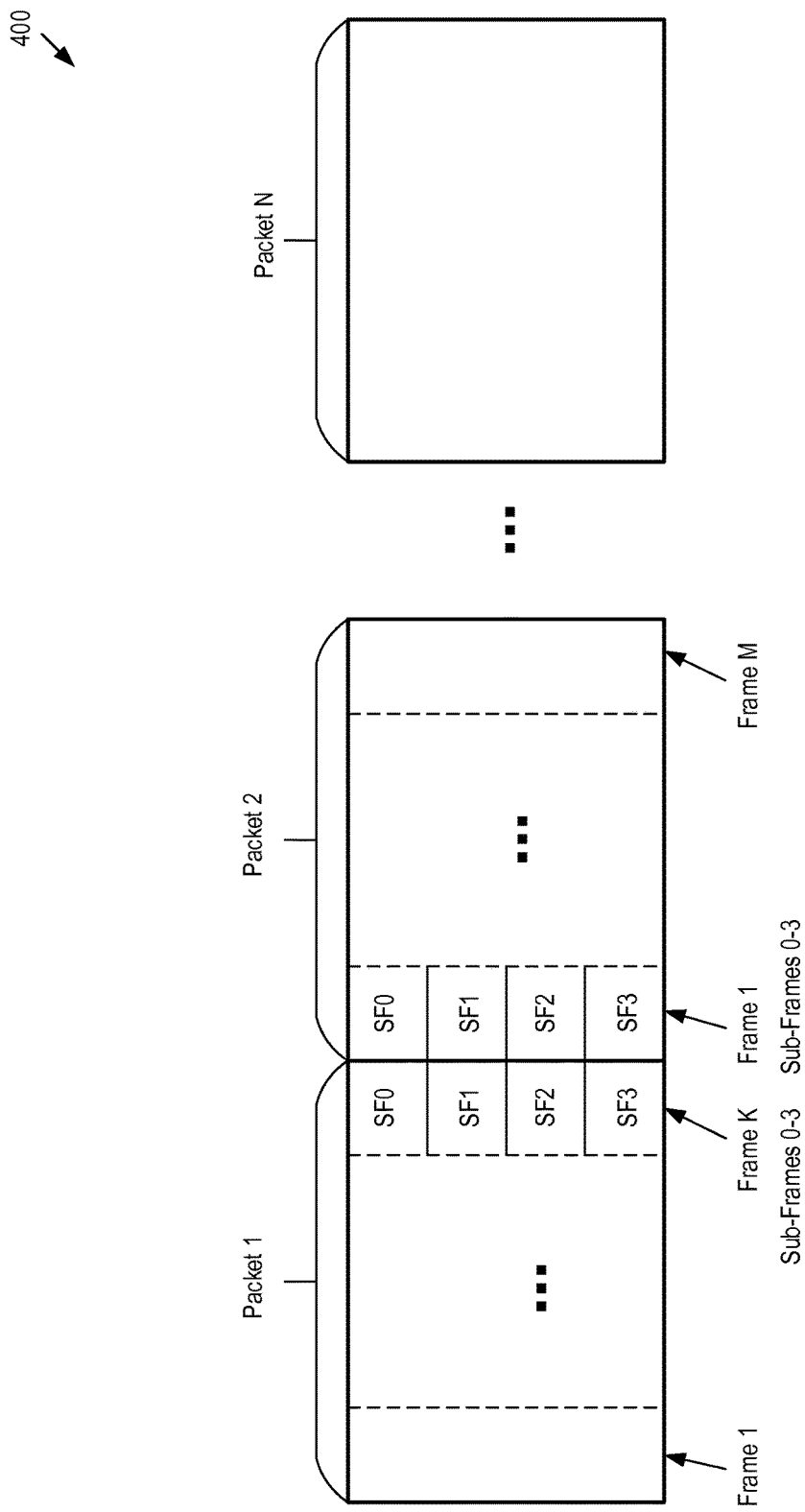
FIG. 4 is a schematic diagram illustrating example structure of an encoded audio stream, which can be processed by the guest or host devices.

The incoming encoded data 112 may be in an XMA (MICROSOFT® XBOX Media Audio) format or other format. Example stream structure of an XMA encoded stream is illustrated in FIG. 4. FIG. 4 is a schematic diagram illustrating example structure of an encoded audio stream, which can be processed by the guest device or host device. Referring to FIG. 4, the example XMA stream 400 (corresponding to encoded data 112) may include a plurality of packets (packet 1, . . . , N), and each packet may be 2048 bytes. Each packet may include encoded data for the same or different number of frames (e.g., packet 1 includes encoded data for frames 1, . . . , K, and packet 2 includes encoded data for frames 1, . . . , M). Each of the frames within a packet may include four sub-frames, e.g., sub-frames SF0, . . . , SF3, as seen in FIG. 4. During decoding of XMA data for stream 400, intermediate data may be used when decoding XMA packets. For example, when decoding SF0 in frame 1 of packet 2, the audio decoder 212 may use data (e.g., intermediate decoded data) associated with SF3 in the previous frame (e.g., SF3 in frame K of packet 1). Decoding of sub-frames SF1-SF3 of a given frame may use intermediate data from a previous sub-frame of the same frame.

Figure 5:
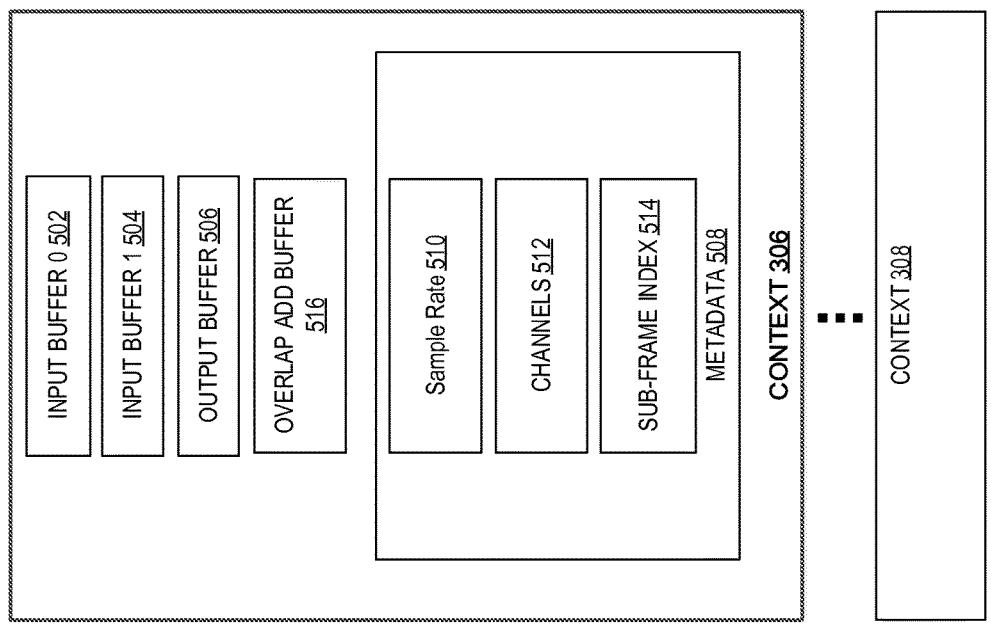
FIG. 5 is a schematic diagram illustrating example data for contexts used during virtualizing of audio decoding hardware, in accordance with an example embodiment of the disclosure.

FIG. 5 is a schematic diagram illustrating example contexts used during virtualizing of audio decoding hardware, in accordance with an example embodiment of the disclosure. Referring to FIG. 5, contexts 306, . . . , 308 are identified based on the encoded data 112, when guest device software 103 is executed on the host device 202. A context (e.g., 306) may include one or more input buffers (e.g., 502-504) configured to store input (encoded) data, an output buffer (e.g., 506) configured to store output/decoded data, as well as metadata 508. Context data may include information (e.g., memory location pointer) identifying input buffer(s) as well as information identifying the output buffer. The metadata 508 may include sample rate 510 associated with the input/encoded stream (e.g., 112), a number of channels 512 associated with the input stream, and sub-frame index information 514. The sub-frame index 514 may indicate sub-frame, frame and packet information associated with a starting point location in the encoded data stream 112, where the audio decoder 212 may start decoding when processing context 306. The context can also include an overlap add buffer (OAB) 516 configured to store samples of intermediate decoded audio (as explained above in reference to FIG. 4), which may be used to decode one or more packets of received data 112. For the OAB 516 within the context (e.g., 306), context data may include information identifying a memory location of the OAB (e.g., OAB can be stored as part of the data buffers 351 in memory 208).

Referring again to FIG. 3, in an example operation, guest device software 103 (which may include game software) may be run on host device 202. Since an emulated guest audio decoder (such as guest audio decoder 110) would seek access to the main memory of a guest device (e.g., at address locations associated with registers 107 and/or memory 108) or dedicated memory of the guest device (e.g., registers 107 and/or memory 108), the registers 107 and memory 108 are emulated in main memory 208 of the host device 202 as emulated guest registers 232 and emulated guest memory 234. In this regard, the audio decoding environment of guest device 102 can be virtualized using the host audio decoder 212, emulated registers 232, emulated memory 234, and dedicated memory 214 of the host audio processor 210 in the host device 202.

As seen in FIG. 3, the emulated guest registers 232 may be located at specific and known address locations inside the main memory 208 (e.g., memory locations used by the guest device 102 for registers 107). For example, guest registers 302, . . . , 304 may occupy memory location from address OOXX through YYZZ. Each of the emulated guest registers 302, . . . , 304 may be a 32-bit register, where each bit may be associated with one of the contexts 306, . . . , 308. Emulated guest memory 234 may also occupy known address locations within the memory 208. Although FIG. 3 shows the data buffers 351 for the contexts 306, . . . , 308 being outside the emulated guest memory 234, alternatively, the data buffers 351 are within the emulated guest memory 234. Virtualizing the audio decoding hardware of the guest device 102 when guest device software 103 is being executed on host device 202 may be achieved by intercepting operations that access the emulated guest registers 232 and/or the emulated guest memory 234, and translating such operations for purposes of using the dedicated memory 214 and for purposes of transferring ownership of context data (e.g., so that data is decoded by the host audio decoder 212 and then transferred back to the main memory 208). For example, a register WRITE operation 330 may be intercepted by the CPU 206, which may trigger performing various audio decoding functionalities as described herein. More specifically, the WRITE operation 330 may be translated to equivalent operation(s) which may be performed in connection with transferring ownership of context data between the dedicated memory 214 of the host audio processor 210 and the main memory 208 of the CPU 206.

As the encoded data 112 is received from the CPU 206, one or more contexts 306, . . . , 308 are identified using the encoded data 112. As explained above in reference to FIG. 5, each context 306, . . . , 308 may include one or more input buffers (such as 502 and 504) as well as an output buffer 506. The input buffers and output buffers are indicated as 352 and 354 in FIG. 3, and may be part of data buffers 351. Context data can track locations for the buffers of the context(s) 306, . . . , 308. As the encoded data 112 is received and context(s) 306, . . . , 308 are identified, the encoded data is stored in an input buffer 352, with the output buffers 354 storing any generated decoded data. The guest device software 103 may attempt to store encoded data into one of the input buffers 352 in the main memory 208 as well as read decoded data from one of the output buffers 354 in the main memory 208, mirroring the data processing sequence performed by the guest audio decoder 110. Therefore, interactions with the buffers 351 in the main memory 208 may be intercepted (e.g., register/memory WRITE operations), and decoding functionality of the host audio decoder 212 using the dedicated memory 214 may be triggered based on such intercepted memory and register WRITE operations.

For example, the guest device software 103 may generate a register WRITE access command 330 to one of the guest registers 232 in order to trigger decoding of received encoded data. When the register WRITE 330 is detected (and a "1" is written into a corresponding bit from bits 302-304), data in a context (such as context 308 in FIG. 3, with a corresponding Bit 1) can be copied into the dedicated memory 214 (as context 308a in FIG. 3) for decoding. During such data copy operation (e.g., 309), the entire context 308 may be copied over into the dedicated memory 214 as context 308a, or only the encoded data 310 associated with context 308 may be copied into the dedicated memory 214. A corresponding "1" may be written in a bit in the hardware decoder registers 320, where the bit is associated with the selected context. Such WRITE operation to the hardware decoder registers 320 is used to relinquish ownership of the context to the audio decoder 212. The host audio decoder 212 may then perform audio decoding on the encoded data 310 inside the dedicated memory 214. As a result, decoded data 312 may be generated and stored (as part of the context). FIG. 3 shown updating of encoded data 310 in the context 308a to decoded data 312 in the context 308b.

In this regard, detection of a register WRITE operation 330 triggers the data copy operation 309, which leads to decoding of the encoded data 310 and generating the decoded data 312 inside the updated context 308b. As explained, a "1" may be written in bit 1 of register 302, which bit is associated with context 308. Having a "1" in the associated bit for a context may indicate that decoding can be initiated. Additionally, writing a "1" in the hardware decoder registers 320 indicates that ownership of the context is transferred from the CPU 206 to the audio decoder 212. Each bit in the emulated guest registers 232 and the hardware decoder registers 320 is associated with a specific context and it determines ownership of that context: a "1" means the context is owned by the decoder hardware (212), and a "0" means the context is owned by the CPU 206. In this regard, the CPU 206 will not attempt to access the memory associated with a context that is currently owned by the decoder 212, and vice versa.

In accordance with an example embodiment of the disclosure, determination of whether decoding is complete (or still incomplete) can be made by the CPU 206 and/or the audio decoder 212 through examining the fields of the context structure in memory, which will indicate if there is encoded data remaining in the input buffers 352 and room available in the output buffer 354 for more decoded data. Such memory examination may be performed by the CPU 206 via the memory/register READ operation 340a, and/or by the audio decoder 212 via the memory/register READ operation 340b.

Upon determining that decoding is complete, a WRITE operation 330 can write a "0" in the corresponding bit of the context that has been decoded, which will trigger a WRITE operation and writing of "0" in the corresponding bit for the context in the hardware decoder registers 320. Writing of "0" in the registers 320 will relinquish ownership of the context from the audio decoder 212 to the CPU 206, and the decoded data can be transferred back to memory 208.

In an example embodiment, when encoded data is copied over during the data copy operation 309, only the input buffer 352 contents are copied over into the dedicated memory 214. When decoding of the encoded data 310 is complete and decoded data 312 has been generated, then decoded data 312 may be stored in output buffer 354, and only the contents of the output buffer 354 are sent back to main memory 208 from the dedicated memory 214. After decoding is complete and the decoded data 312 is transferred over from the dedicated memory 214 into the main memory 208, the decoded data 312 (inside the output buffer 354) is communicated to the CPU 206 for further processing. After the decoded data is communicated to the CPU 206, the input buffer (for example, 352) can be invalidated so that the same context (308) may be reused for another decoding operation.

In accordance with an example embodiment of the disclosure, partial data from a context (in place of the entire context) may be transferred between the main memory 208 and the dedicated memory 214. For example, only the encoded data 310 stored in input buffers 352 may be communicated to the dedicated memory 214, and after decoding is completed, the decoded data 312 can be communicated back to the main memory 208 to update the output buffer 354. During the data transfer between main memory 208 and dedicated memory 214, all or portions of the metadata 508 may be communicated between the main memory 208 and the dedicated memory 214. Also, the overlap add buffer 516 may be copied over between main memory 208 and dedicated memory 214 based on the specific sub-frame that is being decoded. For example, if a sub-frame index 514 associated with the received encoded data for the context 308a indicates that encoded data 310 has to be decoded starting with sub-frame 0 in packet number 2, then intermediate data (such as samples in the overlap add buffer 516) associated with the previous sub-frame (which is sub-frame 3 in packet number 1) may need to be fetched to the dedicated memory 214 as part of the overlap add buffer 516 for use in overlap add operations. On the other hand, in instances when the sub-frame index 514 indicates that encoded data 310 will start at sub-frames number 1, 2 or 3 of a current packet, then the overlap add buffer 516 need not be fetched to the dedicated memory 214, since the previous samples used in overlap add operations are already in the dedicated memory 214. After decoded data 312 is generated and the context 308b is updated, the overlap add buffer 516 may need to be updated and stored back from the dedicated memory 214 into the main memory 208, depending on the sub-frame on which the decoding has ended. For example, if sub-frame number 3 (which is the last sub-frame in the packet) is the last sub-frame that has been decoded and is the last sub-frame in decoded data 312, then the overlap add buffer 516 is updated inside the main memory 208 so that the next packet starting with sub-frame 0 may use the intermediate data associated with sub-frame number 3 of the currently decoded packet. Thus, for decoding, the overlap add buffer 516 may need to be copied from main memory 208 back into the dedicated memory 214 in instances when the encoded data starts with sub-frame number 0 of a given packet. Similarly, the overlap add buffer 516 may need to be stored back from the dedicated memory 214 into main memory 208 if the decoded data 312 has ended with sub-frame number 3 (which is the last sub-frame) of a given packet.

Figure 6:
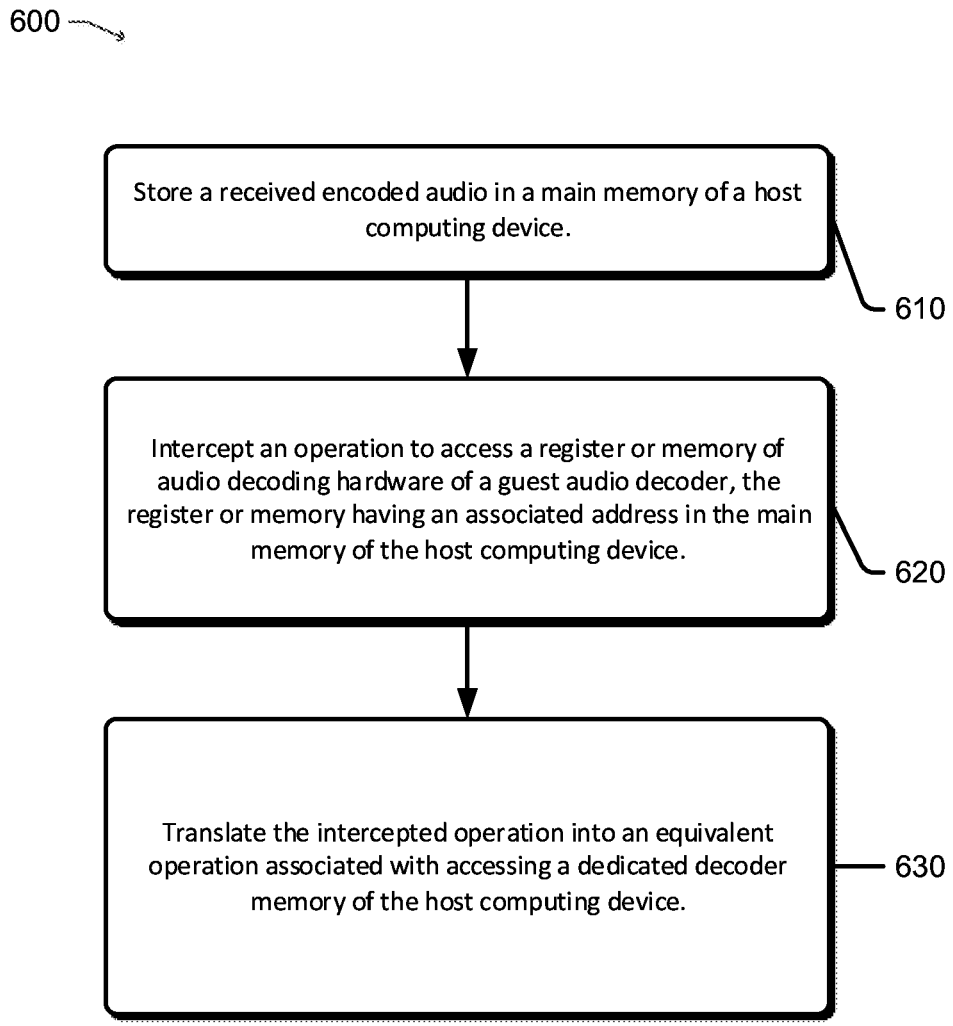
FIGS. 6-8 are flow diagrams illustrating example methods for virtualizing audio decoding hardware of a guest audio decoder, in accordance with one or more embodiments.
Figure 7:
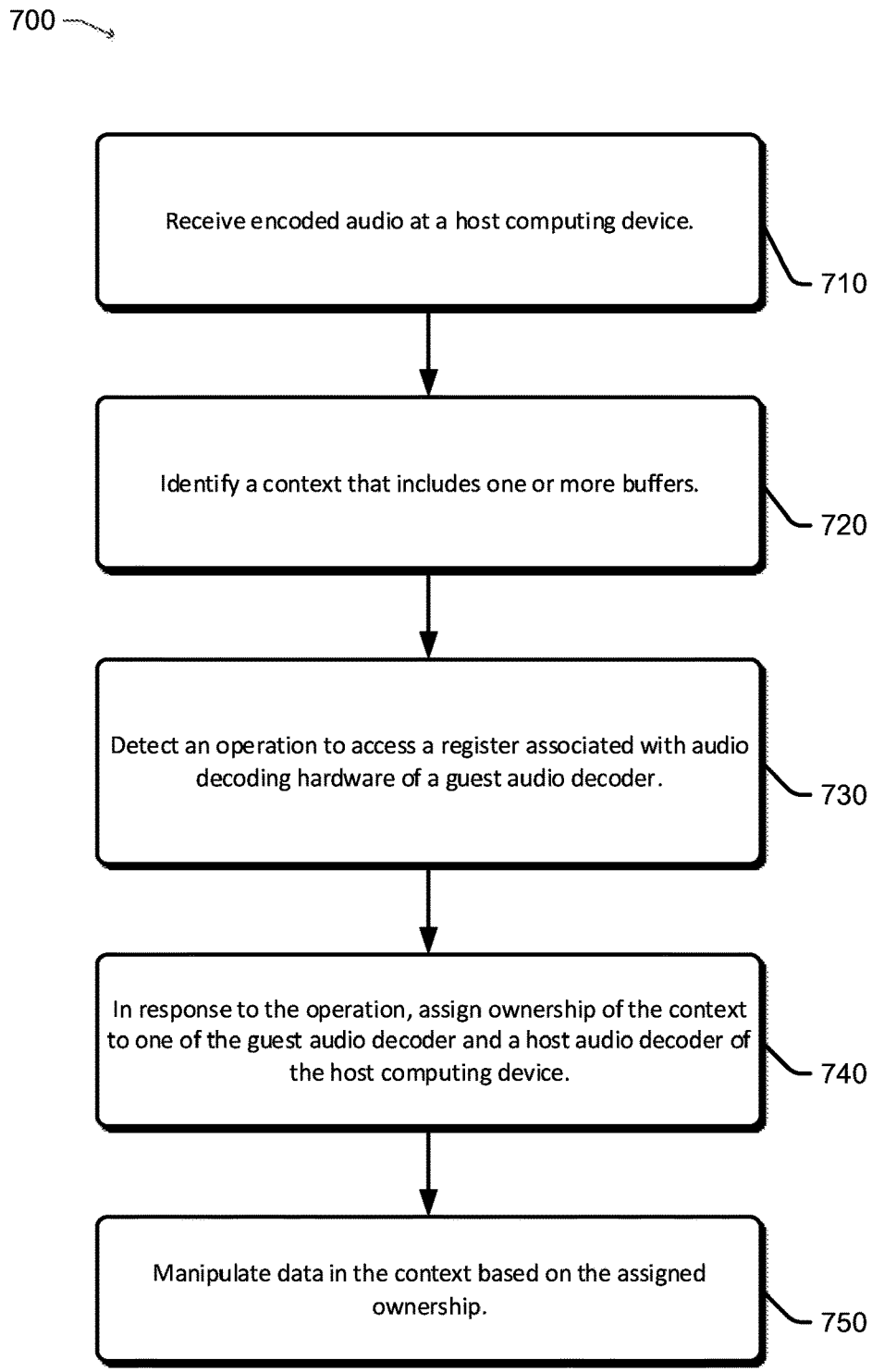
Figure 8:
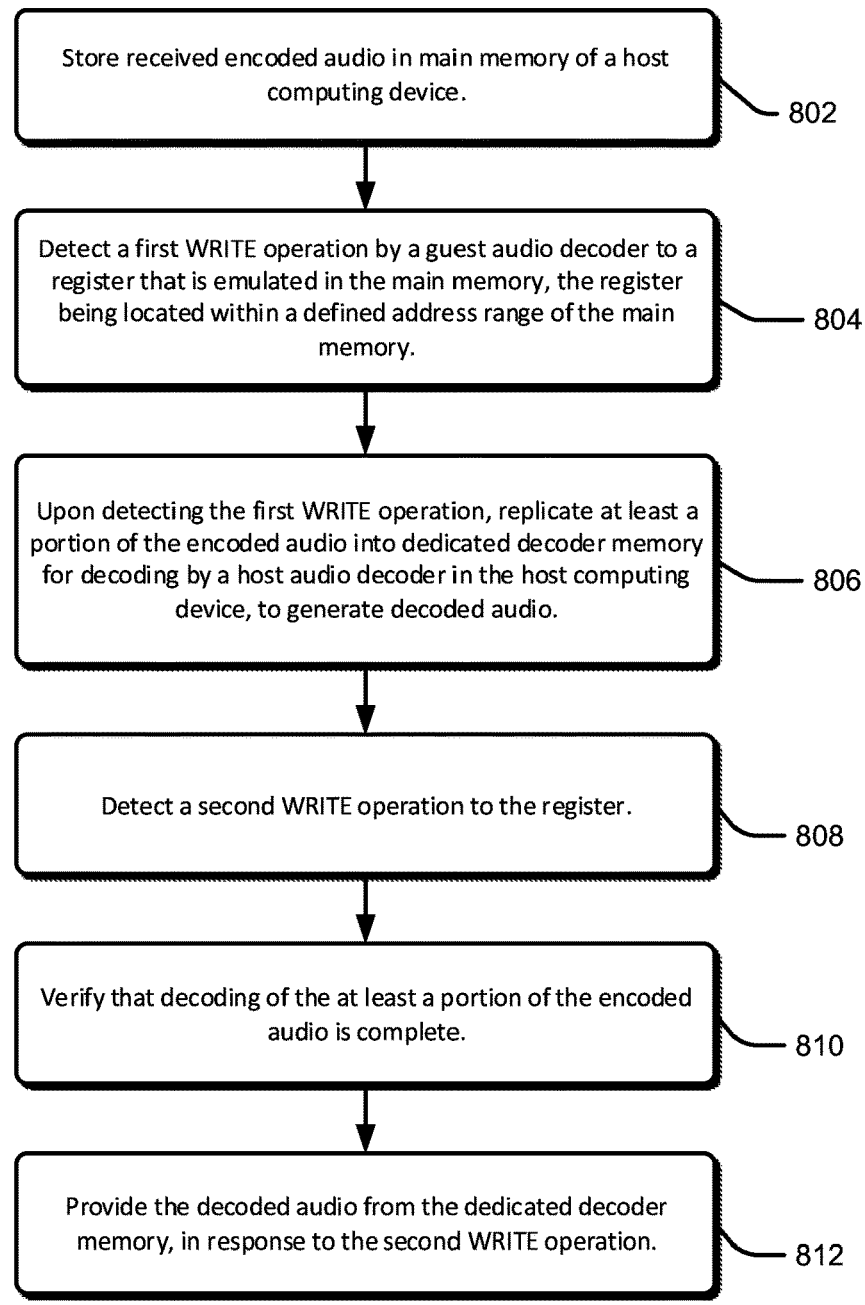

FIGS. 6-8 are flow diagrams illustrating example methods for virtualizing audio decoding hardware of a guest audio decoder, in accordance with one or more embodiments. Referring to FIGS. 1, 2, 3 and 6, the example method 600 may start at 610, when a received encoded audio is stored in a main memory of a host computing device. For example, guest device software 103 can be run using optical disk drive 204 on host device 202, and encoded audio data 112 can be stored initially inside the main memory 208. Encoded data can be stored in input buffers 352 as part of one or more contexts 306, . . . , 308. At 620, an operation to access a register or memory of audio decoding hardware of a guest audio decoder can be intercepted, where the register or memory have an associated address in the main memory of the host computing device. For example and in reference to FIG. 3, emulated guest registers 232 can be stored at known addresses 00XX through YYZZ. The intercepted operation can be, for example, a register WRITE operation 330. At 630, the intercepted operation is translated into an operation associated with accessing a dedicated decoder memory of the host computing device (e.g., transfer of ownership of context data between the main memory 208 and the dedicated memory 214). For example and as explained in reference to FIG. 3 above, after the encoded data 112 is stored as part of the input buffers 352, copying and writing of the encoded data into the dedicated memory 214 is triggered by the register WRITE operation 330 (e.g., writing of a "1" into a corresponding bit in registers 232 and 320 associated with a context may trigger transfer of ownership of the encoded data to the decoder 212). After the encoded data 310 is decoded and decoded data 312 is generated in the decoded memory in the dedicated memory 214, transfer of ownership of the decoded data is achieved by another WRITE operation 330, where a "0" is written in the corresponding bit for the context in registers 232 and 320.

Referring to FIGS. 1, 2, 3 and 7, the example method 700 may start at 710, when an encoded audio is received at a host computing device. For example, encoded audio data 112 can be received at host device 202 after guest device software 103 is run or executed using the optical disk drive or hard drive 204. At 720, a context can be identified that includes one or more buffers. For example, after encoded audio data 112 is received at host device 202, contexts 306, . . . , 308 may be generated and encoded data 112 may be stored as part of input buffers 352 with the input buffer location indicated as part of the contexts (e.g., input buffer information 502 and 504 inside the context as seen in FIG. 5). Each context may include buffers, such as 502-506, as seen in FIG. 5. At 730, an operation to access a register associated with a guest audio decoder can be detected. The register may have an associated register location within a main memory of the host computing device. For example, a register WRITE operation 330 may be detected attempting to write into the emulated guest registers 232 inside the memory 208. As explained above, the emulated guest registers 232 and the emulated guest memory 234 can be associated with the guest audio decoder 110 (emulated guest register 232 can correspond to registers 107 and emulated guest memory 234 can correspond to memory 108 used by the guest device 102). As explained above, a register WRITE operation 330 (e.g., of a "1" into a bit associated with a context) may trigger writing of the encoded data into the dedicated memory 214, transferring ownership of the encoded data to the audio decoder 212, and initiating decoding so that the decoded data 312 is generated and stored in the dedicated memory 214. Another register WRITE operation 330 (e.g., of a "0" into the corresponding bit of a context in registers 232 and 320) may be used to relinquish ownership of the decoded data from the audio decoder 212 back to the CPU 206 (which triggers copying or transferring of the decoded data 312 back into the main memory 208 and updating the output buffers 354).

At 740, in response to the detected operation, ownership of the context can be assigned to one of the guest audio decoder (e.g., 110) and a host audio decoder (e.g., 212) of the host computing device (202), the guest audio decoder having access to main memory (e.g., 208) of the host computing device, and the host audio decoder having access to dedicated decoder memory (e.g., 214) of the host audio decoder. A dedicated memory 214 can be associated with the host audio decoder 212 of the host computing device 202. The dedicated memory 214 is associated with the host audio decoder 212 of the host device 202. In response to the register WRITE operation 330, ownership of the various contexts 306, . . . , 308 can be assigned and transferred between the memory 208 and the dedicated memory 214 (based on whether a "1" or a "0" is written into the corresponding bit for the context in registers 232 and 320). For example, if a register WRITE operation 330 of a "1" is detected into the emulated guest registers 232, a "1" is written into a corresponding bit in registers 320 and ownership of the context is transferred from the memory 208 to the dedicated memory 214 during the data copy operation 309 (e.g., by transferring the context data and the contents of the input buffers 352 into the dedicated memory 214, as part of the context 308a). Upon detection of a register WRITE operation 330 of a "0" into the emulated guest registers 232, a "0" is written into the corresponding bit in registers 320 and ownership of the updated context (e.g., 308b) is transferred from the dedicated memory 214 to the memory 208.

At 750, data in the context may be manipulated based on the assigned ownership. After the context is transferred from the main memory to the dedicated memory 214 after a register WRITE operation 330 is detected, encoded data 310 is processed and decoded so that decoded data 312 is generated, thereby manipulating (e.g., updating) contexts 308a to 308b. Upon detection that decoding is complete (e.g., by using READ operations 34a-340b), a "0" is written into the context bit in registers 232 and 320 so that the decoded data 312 can be transferred from the dedicated memory 214 into memory 208, thereby updating the output buffers 354 associated with the context.

Referring to FIGS. 1, 2, 3 and 8, the example method 800 may start at 802, when received encoded audio is stored in main memory of a host computing device. For example, encoded audio data 112 can be received at CPU 206 after guest device software 103 is executed by the optical disk drive 204. The encoded data 112 can be initially stored in the memory 208 as part of the contexts 306, . . . , 308. At 804, a first WRITE operation (e.g., writing of a "1" into a bit associated with a context) can be detected by a guest audio decoder. The first WRITE operation can be to a register that is emulated in the main memory of the host computing device and the register can be located within a defined address range of the main memory. For example, the emulated guest registers 232 may include registers 302, . . . , 304 and they may be located at predefined addresses, such as address 00XX through YYZZ inside memory 208 of the host device 202. As seen in FIG. 3, a register WRITE operation 330 (of a "1") into the emulated guest registers 232 can be detected by the CPU 206. At 806, upon detecting the first WRITE operation, at least a portion of the encoded audio can be replicated into a dedicated decoder memory for decoding by a host audio decoder in the host computing device in order to generate a decoded audio. For example, upon detecting the first register WRITE operation 330, context 308 can be replicated by the CPU 206 during a data copy operation 309, as context 308a inside the dedicated memory 214.

Alternatively, encoded audio data 112 stored as part of input buffers 352 can be copied over into the dedicated memory 214. At 808, a second WRITE operation to the register may be detected (e.g., a register write of a "0" into the corresponding bit associated with the context being processed). For example, a second WRITE operation 330 into the emulated guest registers 232 can be detected by the CPU 206. Upon detecting the second WRITE operation 330 into the emulated registers 232, the CPU 206 may verify (at 810) that decoding of the at least a portion of the encoded audio is complete. For example, the CPU 206 may use READ operation 340a to determine if there is encoded data remaining in the input buffer and space available in the output buffer, and determine that decoding of the encoded data 310 is complete and decoded data 312 is generated and available for further processing. Upon verification by the CPU 206 that decoded data 312 is complete and is available for processing, the decoded data 312 may be provided (at 812) from the dedicated memory 214 into the main memory 208 in response to the second WRITE operation 330 (e.g., a writing of a "0" into the corresponding register bit for the context in registers 232). If an entire context has been copied into the dedicated memory 214 (for example, context 308a), then the decoded data 312 can be stored as part of the updated context 308b and the entire updated context 308b can be transferred over and stored in memory 208. Alternatively, if only encoded data 310 is transferred over from the main memory 208 into the dedicated memory 214 (for example, transferred as input buffers 352), then the generated decoded data 312 can be used to update the output buffers 354 and invalidate the input buffers 352 associated with the specific context. In this regard, after the decoded data has been transferred from the dedicated memory 214 into the main memory 208 in response to the second WRITE operation 330, the output buffer 354 is updated and the corresponding input buffers 352 are invalidated so that the same context can be reused again for decoding of subsequently received encoded data.

Figure 9:
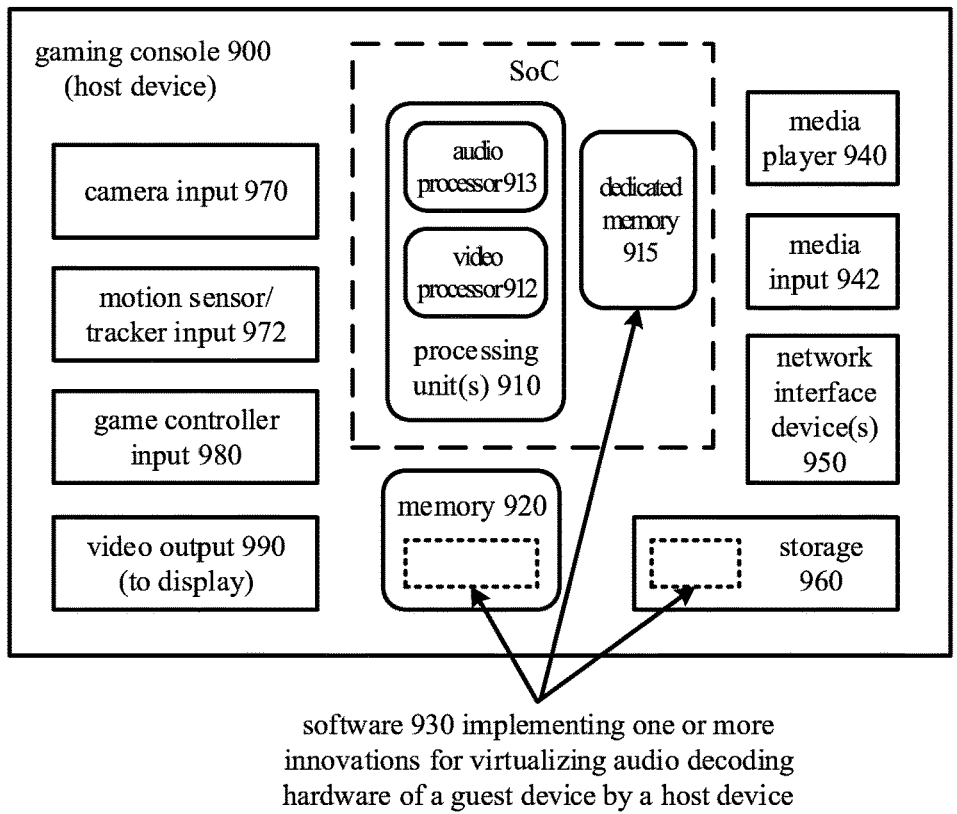
FIG. 9 is a diagram of an example computing system, in which some described embodiments can be implemented.

FIG. 9 is a diagram of an example computing system, in which some described embodiments can be implemented. More specifically, FIG. 9 illustrates a generalized example of a suitable gaming console 900, in which several of the described innovations may be implemented. The innovations described herein relate to virtualizing audio decoding hardware of a guest device in a host device (e.g., 900). Aside from its use in video gaming, the gaming console 900 is not intended to suggest any limitation as to scope of use or functionality, as the innovations may be implemented in diverse computing systems, including special-purpose computing systems adapted for video gaming or graphics processing.

With reference to FIG. 9, the gaming console 900 includes one or more processing units 910 and memory 920. The processing unit(s) 910 execute computer-executable instructions. A processing unit can be a central processing unit ("CPU"), a processor in an application-specific integrated circuit ("ASIC") or any other type of processor. As shown in FIG. 9, the processing unit(s) 910 can be part of a system-on-a-chip ("SoC"), and may include a video processor 912, an audio processor 913 and a dedicated memory 915. The memory 915, 920 may be volatile memory (e.g., registers, cache, RAM), non-volatile memory (e.g., ROM, EEPROM, flash memory, etc.), or some combination of the two, accessible by the processing unit(s) 910. The memory 920 stores software 930 implementing one or more innovations for virtualizing audio decoding hardware of a guest device in a host device, in the form of computer-executable instructions.

The gaming console 900 optionally includes a media player 940 and media input 942. The media player 940 can play DVDs, Blu-ray disks, other disk media and/or other formats of media. The media input 942 can accept input video in analog or digital form (e.g., from a cable input, HDMI input or other input) and/or accept input audio in analog or digital form.

The gaming console 900 includes one or more network interface devices 950. The network interface device(s) 950 enable communication over a network to another computing entity (e.g., server, other gaming console). The network interface device(s) 950 can support wired connections and/or wireless connections, for a wide-area network, local-area network, personal-area network or other network. For example, the network interface device(s) can include one or more Wi-Fi transceivers, an Ethernet port, a cellular transceiver and/or another type of network interface device, along with associated drivers, software, etc. The network interface device(s) 950 convey information such as computer-executable instructions, audio or video input or output, or other data in a modulated data signal over network connection(s). A modulated data signal is a signal that has one or more of its characteristics set or changed in such a manner as to encode information in the signal. By way of example, and not limitation, the network connections can use an electrical, optical, RF, or other carrier.

The storage 960 may be removable or non-removable, and includes magnetic disks, magnetic tapes or cassettes, optical disk media and/or any other media which can be used to store information and which can be accessed within the gaming console 900. The storage 960 stores instructions for the software 930 implementing one or more innovations for virtualizing audio decoding hardware of a guest device in a host device.

A camera input 970 accepts video input in analog or digital form from a video camera, which captures natural video. An audio input (not shown) accepts audio input in analog or digital form from a microphone, which captures audio.

The gaming console optionally includes a motion sensor/tracker input 972 for a motion sensor/tracker, which can track the movements of a user and objects around the user. For example, the motion sensor/tracker allows a user (e.g., player of the game) to interact with the gaming console 900 through a natural user interface using gestures and spoken commands. The motion sensor/tracker can incorporate gesture recognition, facial recognition and voice recognition.

A game controller input 980 accepts control signals from one or more game controllers, over a wired connection or wireless connection. The control signals can indicate user inputs from one or more directional pads, buttons, triggers and/or one or more joysticks of a game controller. The control signals can also indicate user inputs from a touchpad or touchscreen, gyroscope, accelerometer, angular rate sensor, magnetometer and/or other control or meter of a game controller.

A video output 990 provides video output to a display device. The video output 990 can be an HDMI output or other type of output. An audio output (not shown) provides audio output to one or more speakers.

The gaming console 900 includes a video processor 912 that can process (e.g., encode, decode) gameplay video and/or camera video. The gaming console 900 also includes an audio processor 913 that can process audio (e.g., decode encoded audio stream of a game being played on console 900, encode audio from audio input). The video processor 912 and audio processor 913 are provided with special-purpose processing hardware as part of a SoC with the processing unit(s) 910. Alternatively, the audio/video processors 913/912 are implemented as software encoders/decoders that run on one of the processing unit(s) 910. Or, the audio/video processors 913/912 can be implemented using hardware acceleration with hardware of the gaming console 900. The video processor 912 can handle video formatted according to the H.264/AVC standard or formatted according to another standard or format (e.g., H.265/HEVC, VPx, SMPTE 421M or another format).

The audio processor 913 can perform functions similar to the functions of the audio decoder 212, using a dedicated memory (e.g., dedicated memory 915). The audio processor 913 can be configured to encode and/or decode audio associated with the gameplay video and/or camera video. The audio processor 913 can handle encoded audio data in AAC format, HE-AAC format, a Windows Media Audio format (including variations such as XMA), MP3 format, or another format, and/or decoded audio in PCM format or another type of decoded audio format.

The gaming console 900 may have additional features. For example, the gaming console 900 includes one or more other input devices and/or one or more other output devices. The other input device(s) may be a touch input device such as a keyboard, mouse, pen, or trackball, a scanning device, or another device that provides input to the gaming console 900. The other output device(s) may be a printer, CD-writer, or another device that provides output from the gaming console 900.

An interconnection mechanism (not shown) such as a bus, controller, or network interconnects the components of the gaming console 900. Typically, operating system software (not shown) provides an operating environment for other software executing in the gaming console 900, and coordinates activities of the components of the gaming console 900.

One or more "companion" devices (not shown) can be associated with the gaming console 900. A companion device runs a companion application that facilitates interaction with the gaming console 900. A companion device is typically a smartphone or tablet, but can instead be a computing device with some other form factor. The companion application can allow the companion device to serve as an additional screen and/or controller for media content or gameplay. Or, the companion application can allow the companion device to serve as a media source or messaging tool for the gaming console 900.

The innovations can be described in the general context of computer-readable media. Computer-readable media are any available tangible media that can be accessed within a computing environment. By way of example, and not limitation, with the gaming console (900), computer-readable media include memory 920, dedicated memory 915, storage 960, and combinations thereof.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or hardware with software implementing the functionality described herein.

For the sake of presentation, the detailed description uses terms like "determine," "receive" and "provide" to describe computer operations in a computing system. These terms are high-level abstractions for operations performed by a computer, and should not be confused with acts performed by a human being. The actual computer operations corresponding to these terms vary depending on implementation.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing device, comprising:
one or more processing units;
one or more memories, coupled to at least one of the one or more processing units, the one or more memories comprising computer-executable instructions for performing operations for virtualizing audio decoding hardware of a guest audio decoder, the operations for virtualizing the audio decoding hardware comprising:

storing encoded audio in main memory of a host computing device;

receiving a guest audio decoder access operation, the guest audio decoder access operation comprising a request to WRITE data to a register or memory of the guest audio decoder, the register or memory of the guest audio decoder being emulated at an address in the main memory of the host computing device;

translating the guest audio decoder access operation into at least one action to access dedicated memory of a host audio decoder, the at least one action comprising copying the stored encoded audio to the dedicated memory of the host audio decoder;

performing the copying, the performing the copying directing the host audio decoder to decode the encoded audio stored in the dedicated memory of the host audio decoder, thereby producing decoded audio;

decoding the encoded audio to produce decoded audio;

determining that the decoding is complete;

in response to determining that the decoding is complete, transferring the decoded audio to the main memory of the host computing device; and processing the decoded audio for output to an audio output.

2. The computing device of claim 1, wherein the guest audio decoder access operation is a register WRITE operation.

3. The computing device of claim 2, wherein the register WRITE operation includes writing of a value into a register bit, and the operations for virtualizing the audio decoding hardware further comprise:

replicating at least a portion of the encoded audio in the dedicated memory of the host audio decoder; and the decoding comprises decoding the replicated portion of the encoded audio by the host audio decoder to generate the decoded audio.

4. The computing device of claim 1, wherein the operations for virtualizing the audio decoding hardware further comprise:

determining that the decoded audio is available in the dedicated memory of the host audio decoder, the decoded audio having been generated by the host audio decoder using at least a portion of the encoded audio.

5. The computing device of claim 4, wherein the operations for virtualizing the audio decoding hardware further comprise:

accessing a register in the dedicated memory of the host audio decoder to verify that generation of the decoded audio is complete.

6. The host computing device of claim 1, wherein the request to WRITE data sets a bit in the register or memory of the guest audio decoder being emulated at an address in the main memory of the host computing device to indicate that the guest audio decoder access operation is a WRITE operation.

7. The computing device of claim 1, the computer-executable instructions further comprising instructions for performing:

as part of the translating, transferring ownership of a context associated with the encoded audio from the one or more processing units to the host audio decoder, the context comprising an identifier of at least one buffer; and in response to determining that the decoding is complete, transferring ownership of the context to the one or more processing units.

8. In a host computing device that includes a host audio decoder, a method for virtualizing audio decoding hardware of a guest audio decoder, the method comprising:

storing encoded audio in main memory of the host computing device;

receiving a guest audio decoder access operation, the guest audio decoder access operation comprising a request to WRITE data to a register or memory of the guest audio decoder, the register or memory of the guest audio decoder being emulated in the main memory of the host computing device;

copying the stored encoded audio to dedicated memory of the host audio decoder;

directing the host audio decoder to decode the encoded audio stored in the dedicated memory of the host audio decoder;

decoding the encoded audio to produce decoded audio;

determining that the decoding is complete;

in response to determining that the decoding is complete, transferring the decoded audio to the main memory of the host computing device; and processing the decoded audio for output to an audio output.

9. The method of claim 8, wherein the guest audio decoder access operation is a register WRITE operation.

10. The method of claim 9, wherein the register WRITE operation includes writing of a value into a register bit, the method further comprising:

replicating at least a portion of the encoded audio in the dedicated memory of the host audio decoder; and the decoding comprises decoding the replicated portion of the encoded audio by the host audio decoder to generate the decoded audio.

11. The method of claim 8, further comprising:

determining that the decoded audio is available in the dedicated memory of the host audio decoder, the decoded audio having been generated by the host audio decoder using at least a portion of the encoded audio.

12. The method of claim 11, further comprising:

accessing a register in the dedicated memory of the host audio decoder to verify that generation of the decoded audio is complete.

13. The host computing device of claim 8, wherein the request to WRITE data sets a bit in the register or memory of the guest audio decoder being emulated at an address in the main memory of the host computing device to indicate that the guest audio decoder access operation is a WRITE operation.

14. The method of claim 8, further comprising:

prior to the decoding, transferring ownership of a context associated with the encoded audio from one or more processing units to the host audio decoder, the context comprising an identifier of at least one buffer; and in response to determining that the decoding is complete, transferring ownership of the context to the one or more processing units.

15. A computer-readable storage medium storing computer-executable instructions for causing a host computing device to perform operations for virtualizing audio decoding hardware of a guest audio decoder, the operations for virtualizing audio decoding hardware comprising:

storing encoded audio in main memory of the host computing device;

receiving a guest audio decoder access operation, the guest audio decoder access operation comprising a request to WRITE data to a register or memory of the guest audio decoder, the register or memory of the guest audio decoder being emulated at an address in the main memory of the host computing device;

translating the guest audio decoder access operation into at least one action taken to access dedicated memory of a host audio decoder of the host computing device, the at least one action comprising copying the stored encoded audio to dedicated memory of the host audio decoder;

performing the copying, the performing the copying directing the host audio decoder to decode the encoded audio stored in the dedicated memory of the host audio decoder, thereby producing decoded audio;

directing the host audio decoder to decode the encoded audio stored in the dedicated memory of the host audio decoder;

decoding the encoded audio to produce decoded audio;

determining that the decoding is complete;

in response to determining that the decoding is complete, transferring the decoded audio to the main memory of the host computing device; and processing the decoded audio for output to an audio output.

16. The computer-readable storage medium of claim 15, wherein the guest audio decoder access operation is a register WRITE operation.

17. The computer-readable storage medium of claim 16, wherein the register WRITE operation includes writing of a value into a register bit, and the operations for virtualizing the audio decoding hardware further comprise:

replicating at least a portion of the encoded audio in the dedicated memory of the host audio decoder; and the decoding comprises decoding the replicated portion of the encoded audio by the host audio decoder to generate the decoded audio.

18. The computer-readable storage medium of claim 15, wherein the operations for virtualizing the audio decoding hardware further comprise:

determining that the decoded audio is available in the dedicated memory of the host audio decoder, the decoded audio having been generated by the host audio decoder using at least a portion of the encoded audio.

19. The computer-readable storage medium of claim 18, wherein the operations for virtualizing the audio decoding hardware further comprise:

accessing a register in the dedicated memory of the host audio decoder to verify that generation of the decoded audio is complete.

20. The computer-readable storage medium of claim 15, the operations further comprising:

as part of the translating, transferring ownership of a context associated with the encoded audio from one or more processing units to the host audio decoder, the context comprising an identifier of at least one buffer; and in response to determining that the decoding is complete, transferring ownership of the context to the one or more processing units.

* * * * *